United States Patent
Kraus et al.

(10) Patent No.: US 11,603,061 B2
(45) Date of Patent: Mar. 14, 2023

(54) SECONDARY BAR SECURING DEVICE (71) Applicant: MACK RIDES GMBH & CO. KG, Waldkirch (DE)

(72) Inventors: Michael Kraus, Ehrenkirchen (DE); Guenter Burger, Waldkirch (DE)

(73) Assignee: MACK RIDES GMBH & CO. KG, Waldkirch (DE)

(*) Notice: Subject to any disclaimer, the term of this patent is extended or adjusted under 35 U.S.C. 154(b) by 388 days.

(21) Appl. No.: 16/762,940

(22) PCT Filed: Jul. 27, 2018

(86) PCT No.: PCT/EP2018/070445
§ 371 (c)(1),
(2) Date: May 10, 2020

(87) PCT Pub. No.: WO2019/091610
PCT Pub. Date: May 16, 2019

(65) Prior Publication Data
US 2020/0307485 A1    Oct. 1, 2020

(30) Foreign Application Priority Data

Nov. 10, 2017    (DE) .......................... 102017126488.4

(51) Int. Cl.
*B60R 21/02*    (2006.01)
*A63G 7/00*    (2006.01)
(Continued)

(52) U.S. Cl.
CPC ............... *B60R 21/02* (2013.01); *A63G 7/00* (2013.01); *A63G 21/04* (2013.01); *A63G 31/00* (2013.01);
(Continued)

(58) Field of Classification Search
CPC .. A63G 3/00; A63G 31/00; B60R 2021/0097; B60R 22/14; B60R 21/02
(Continued)

(56) References Cited

U.S. PATENT DOCUMENTS 5,489,212 A    2/1996    Masao et al.
6,637,341 B2   10/2003   Kroon et al.
(Continued)

FOREIGN PATENT DOCUMENTS

EP    0911224 A1    4/1999
EP    1059207 A1    12/2000
(Continued)

OTHER PUBLICATIONS

Office Action dated Dec. 16, 2022, in parallel pending Chinese patent application No. 201880072791.5.
(Continued)

*Primary Examiner* — Kien T Nguyen
(74) *Attorney, Agent, or Firm* — Nath, Goldberg & Meyer; Jerald L. Meyer; Stanley N. Protigal (57) ABSTRACT A secondary bar securing device (3) of a safety bar (4) of an amusement ride has a primary securing device that keeps the safety bar (4) in an angular position adapted to the anatomy of the passenger during travel of the amusement ride, and first and second blocking elements (21, 22) arranged at a distance (25) to each other. In the event of a malfunction of the primary securing device, the safety bar (4) can be moved in a tolerance opening angle, which correlates to the distance (25) between the blocking elements (21, 22). If the tolerance opening angle is exceeded, one of the blocking elements (21, 22) block the safety bar (4).

20 Claims, 4 Drawing Sheets (51) Int. Cl.
   *A63G 21/04*   (2006.01)
   *A63G 31/00*   (2006.01)
   *A63G 31/02*   (2006.01)
   *B60R 21/00*   (2006.01)

(52) U.S. Cl.
   CPC ...... *A63G 31/02* (2013.01); *B60R 2021/0097* (2013.01); *B60R 2021/028* (2013.01)

(58) Field of Classification Search
   USPC .......................... 472/43, 59–61, 130; 104/53
   See application file for complete search history.

(56) References Cited

U.S. PATENT DOCUMENTS

| | | |
|---|---|---|
| 2008/0143158 A1 | 6/2008 | Roodenburg et al. |
| 2008/0303260 A1* | 12/2008 | Jaskol ............... B60R 22/48 |
| | | 280/801.1 |
| 2010/0307288 A1 | 12/2010 | Lubman et al. |
| 2012/0068521 A1 | 3/2012 | Roodenburg et al. |
| 2015/0251619 A1* | 9/2015 | Sutherland ........... A63G 31/00 |
| | | 104/53 |

FOREIGN PATENT DOCUMENTS

| | | |
|---|---|---|
| JP | H0282653 U | 6/1990 |
| WO | 2014/194969 A1 | 12/2014 |

OTHER PUBLICATIONS

Office Action dated Jun. 13, 2018 in corresponding German patent application No. 10 2017 126 488.4.

\* cited by examiner

SECONDARY BAR SECURING DEVICE

This is a National Phase Application filed under 35 U.S.C. 371 as a national stage of PCT/EP2018/070445, filed Jul. 27, 2018, an application claiming the benefit of German Application No. 10 2017 126 488.4, filed Nov. 10, 2017, the content of each of which is hereby incorporated by reference in its entirety.

FIELD

The invention relates to a secondary bar securing device of a primary securing device, a seat assembly with a secondary securing device according to the invention, as well as an amusement ride.

BACKGROUND

Safety bars for amusement rides are known from the prior art in various designs. Such amusement rides are, for example, roller coasters, in which the passengers are subjected to strong accelerations. During travel with an amusement ride, the passenger is retained in the seat by means of a safety bar, wherein the safety bar is stopped by means of a locking system. According to DIN standard EN 13814, a corresponding locking system is specified depending on the acceleration acting on the passenger.

In order for passengers to enter and exit the vehicle, the safety bar and/or the locking system is released and the safety bar is pivoted about an axis of rotation by means of a bar adjusting unit. In contrast, the safety bar is locked during the ride by means of a mechanical lock or the bar adjusting unit, which often also forms the primary locking system, to the extent that the safety bar remains in the closed position even in the event of malfunction of the bar adjusting units.

The disadvantage with the prior art is that the known mechanical locks or the primary locking systems are subject to extensive wear due to the continuous use and load and are thereby expensive to maintain. In addition, mechanical locks are associated with additional weight, whereby greater energy is required for acceleration due to the higher weights of the vehicle.

SUMMARY

The object of the present invention is to provide a secondary bar securing device which only blocks the safety bar when the primary securing device malfunctions. The secondary bar securing device according to the invention should be disabled when the primary securing device is intact so that it is not subjected to load or wear and the maintenance costs are thus significantly reduced. Moreover, the secondary bar securing device according to the invention should be especially reliable and economical to produce as well as have a low weight. In addition, in the event of malfunction of the primary securing device, the secondary bar securing device according to the invention should safely transfer high retention forces with relatively streamlined components and provide this transfer of force with very low force required.

A further object to be achieved by the present invention is to provide a secondary bar securing device which enables continuous safeguarding of the closing angle of the safety bar. Thus, the closing angle of the safety bar should be safeguarded regardless of the anatomy of the passenger.

These objects are achieved by means of a secondary bar securing device, a seat assembly with the secondary bar securing device, as well as an amusement ride.

The secondary bar securing device according to the invention of a safety bar of an amusement ride comprises a primary securing device which keeps the safety bar in an angular position that is adapted to the anatomy of the passenger during travel of the amusement ride, and at least one first blocking element and at least one second blocking element, wherein the at least one first blocking element and the at least one second blocking element are arranged at a distance to one another. Upon a malfunction in the primary securing device, the safety bar can be moved in a tolerance opening angle, whereby the blocking elements are always free of load and thus free of wear during standard operation. The tolerance opening angle in this case is in a specified ratio to the distance between the at least one first and the at least one second blocking element. When the tolerance opening angle of the safety bar is exceeded, the at least one first blocking element and the at least one second blocking element block the safety bar to the extent that the passenger continues to be securely held. Accordingly, the secondary bar securing device is always free of load. This results in an especially light construction, because there is no cyclical load but only a quasi static load.

Furthermore, the secondary bar securing device according to the invention comprises, for the pivotable safety bar of an amusement ride, at least one first axis of rotation which is coupled to the pivot movement of the safety bar and at least one second axis of rotation which is coupled to the at least one first axis of rotation. The at least one first axis of rotation in this case may be the axis of rotation of the safety bar or a further axis of rotation which is directly or indirectly coupled mechanically to the safety bar axis of rotation. Moreover, at least one first blocking element is attached to the at least one first axis of rotation, and at least one second blocking element is attached to the at least one second axis of rotation. In the flow of force between the at least one first blocking element and the at least one second blocking element, the at least one adjustment device is further provided, by means of which the flow of force can be interrupted or established between the at least one first blocking element and the at least one second blocking element. In the activated state of the adjustment device, the at least one first blocking element and the at least one second blocking element follow the rotation of the at least one first and the at least one second axis of rotation and are wedged together, whereby further twisting of the axes of rotation is suppressed and thus the safety bar is stopped.

According to an advantageous embodiment of the present invention, the at least one adjustment device is arranged between one of the axes of rotation and one of the blocking elements. It is especially preferred in this case when the adjustment device is provided between the at least one second axis of rotation and the at least one second blocking element.

The adjustment device may furthermore be designed as an electromagnetic spring-actuated brake or as an electromagnetic actuator, wherein the adjustment device is activated in the de-energized state of the adjustment device and deactivated when the adjustment device is energized. Thus, the energized electromagnetic spring-actuated brake can interrupt the flow of force between the first blocking element and the second blocking element. In doing so, it is advantageous when the adjustment device is arranged on a first end of the second axis of rotation, whereby a compact construction results. Furthermore, as an alternative, the adjustment device may be a permanent magnet brake or a differently designed actuator or a different coupling variant which can be electrically and/or mechanically actuated.

According to a further advantageous embodiment of the present invention, the at least one first axis of rotation is coupled to the at least one second axis of rotation by means of at least one linkage. The at least one linkage can be formed respectively from a lever on the respective axis of rotation, wherein the levers are connected to a connecting rod. In this case, it is especially advantageous when the linkage is arranged on a second end of the first axis of rotation and on a second end of the second axis of rotation.

Furthermore, it is advantageous when the at least one first axis of rotation is coupled to the at least one second axis of rotation by means of gearing. In this case, it is further preferred when the gearing is arranged on a second end of the first axis of rotation and on a second end of the second axis of rotation. The gearing may be formed as toothed gearing, a belt drive, chain gearing, or the like. It is especially preferred in this case when the transmission ratio is about 1:1.

It has furthermore proven to be especially advantageous when the at least one first axis of rotation and the at least one second axis of rotation are arranged in parallel and spaced apart from one another. This ensures an especially simple and uncomplicated and space-saving construction of the secondary bar securing device.

Moreover, it is advantageous when the at least one first axis of rotation and the at least one second axis of rotation are coupled oppositely. The opposite coupling of the at least one first axis of rotation and the at least one second axis of rotation has the advantage that the blocking elements are wedged together such that, in the wedged state of the blocking elements, no torques have to be transferred via the axes of rotation and the adjustment device.

According to a further advantageous embodiment, at least one of the blocking elements is formed eccentrically, entirely or in areas, with respect to the respective axis of rotation. Due to the eccentric arrangement, the respective blocking elements can initially rotate freely about a specified angle in the closed state of the adjustment device. The blocking elements do not wedge together until the specified angle is exceeded. This angle is to be specified according to the amusement ride and the risk assessment and corresponds to a safety bar opening angle which is accepted during malfunction of the primary locking system.

At least one of the blocking elements may furthermore advantageously have at least one eccentric stop. In the wedged state of the blocking elements, the stop prevents a further rotation, whereby subsequent releasing of the blocking effect then requires less force.

Moreover, the blocking elements may have at least one corresponding toothed edge with respect to each other, with the toothed edges engaging when the blocking elements wedge together. It is especially preferable in this case when one of the blocking elements is designed as external toothing of a spur gear which is arranged coaxially with respect to the respect axis of rotation, and the other blocking element is arranged as corresponding, eccentrically arranged internal toothing. Particularly with an opposite coupling of the at least one first axis of rotation and the at least one second axis of rotation, the toothed edges move reciprocally into the wedged position.

According to a further advantageous embodiment of the present invention, at least one reset device is provided, by means of which the at least one of the blocking elements is retained in a starting position by means of a spring force. Especially preferably, the reset device is arranged on the at least one second blocking element, whereby said blocking element is retained in the starting position in the decoupled state of the adjustment device. The spring force applies a torque to the respective blocking element. The torque must be less than the torque which can be transferred by the adjustment device.

Moreover, it is especially advantageous when, in the starting position of the blocking elements, a distance is arranged between the at least one first blocking element and the at least one second blocking element, whereby, during error-free operation of the safety bar, the secondary bar securing device is always retained in a manner that is free of load and wear. The distance is especially preferably set by means of a threaded bolt of the reset device, wherein a gap size and/or the distance can be set by the angular position of the threaded bolt. The distance between the at least one first blocking element and the at least one second blocking element is to be specified depending on the amusement ride and the risk assessment and defines the permissible opening angle of the safety bar in the event of malfunction of the primary securing device. The permissible opening angle depends directly on the distance between the first blocking element and the second blocking element.

Moreover, the secondary bar securing device may have an emergency manual function, by means of which the wedging together of the blocking elements is prevented. The emergency manual function is necessary for the evacuation of the amusement ride and/or of the amusement ride vehicle when the adjustment device cannot be operated. This situation may occur, for example, when a vehicle of the amusement ride is stranded, and there is no power available to operate the electromagnetic spring-actuated brake. The emergency manual function is preferably formed by an operable locking bolt which engages a link, whereby a rotation of the respective blocking element is prevented. The locking torque of the locking bolt in this case must be dimensioned larger than the coupling torque of the adjustment device and/or the frictional torque of the electromagnetic spring-actuated brake.

Furthermore, the present invention relates to a seat assembly of an amusement ride, consisting of at least one seat, at least one pivotable safety bar for securing at least one passenger on the at least one seat, at least one secondary bar securing device, and at least one bar adjusting unit, wherein the bar adjusting unit pivots the safety bar. During movement of the vehicle, the adjustment device is in the activated state. Upon a malfunction in the bar adjusting unit and/or the primary securing device and a slight opening movement of the safety bar, the two blocking elements wedge together, whereby the safety bar is stopped upon a malfunction in the primary securing device and/or the at least one bar adjusting unit. Such blocking by the secondary bar securing device thus occurs exclusively when the bar adjusting unit and/or the primary locking system malfunctions.

Moreover, it is especially advantageous when the bar adjusting unit is a pressure cylinder or a mechanical locking cylinder. In particular, pressure cylinders are especially reliable and can supply forces large enough to quickly feed and securely stop the safety bar. The bar adjusting unit acts as the primary locking system during travel and stops the safety bar in the closed position.

According to a further advantageous embodiment of the present invention, at least one deflection rocker is provided for transferring the feed movement between the bar adjusting unit and the safety bar. The deflection rocker is coupled to the bar adjusting unit on one side and to the safety bar on the other and coverts a feed of the bar adjusting unit or a pivot movement of the safety bar into a rotation of the first axis of rotation.

Moreover, it has proven to be especially advantageous when the at least one first axis of rotation is the axis of rotation of the safety bar. The secondary bar securing device is accordingly positioned directly on the bearing of the safety bar, whereby an especially compact and safer construction results which is associated with a lower number of critical components and weight advantages as well.

A further aspect of the present invention relates to an amusement ride with at least one rail and at least one vehicle moving on the rail with at least one seat assembly having at least one secondary bar securing device.

According to an especially advantageous embodiment of the present invention, it is provided in this case that the amusement ride has a railway station and that, in the railway station, at least one electrical connection is established between the railway station and the vehicle, by means of which the adjustment device of the at least one seat assembly is actuated. In the railway station, the secondary bar securing device is switched off by an actuation of the adjustment device during entry and exit of the passengers, and a pivot movement of the safety bar is enabled.

BRIEF DESCRIPTION OF THE DRAWINGS

Two preferred exemplary embodiments of the invention are described in detail in the following with reference to the accompanying figures. The figures show the following.

DETAILED DESCRIPTION

A seat assembly 2 with a secondary bar securing device 3 of an amusement ride 1 (not shown) according to a preferred exemplary embodiment of the invention is described in detail in the following with reference to FIGS. 1 to 5.

Figure 1:
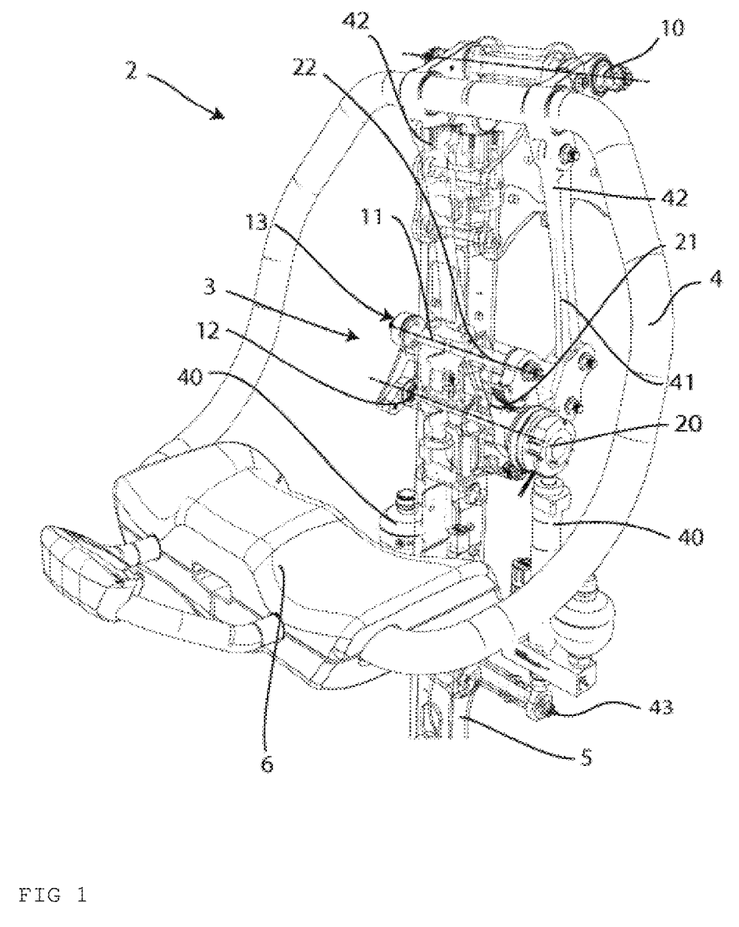
FIG. 1 a seat assembly according to the invention with a seat and with a pivotable safety bar, which secures the passenger on the seat, which is secured by means of a secondary bar securing device according to the invention in order to increase passenger safety.

FIG. 1 shows the seat assembly 2 with the secondary bar securing device 3 according to the invention. Such seat assemblies 2 comprise a seat 6 as well as a safety bar 4 and are used in amusement rides 1 to secure the passenger during high rates of acceleration. An example of such type of amusement ride 1 is a roller coaster, for example.

Typically, one or more seat assemblies 2 are attached to a vehicle (not shown) by means of a seat support 5, wherein the vehicle travels a circumferential rail (not shown) of the amusement ride 1 during operation. In a railway station (not shown), the safety bars 4 are opened so that the passenger or passengers can enter or exit. In order to provide the passenger with the best-possible experience and unlimited view to the extent possible during the ride, the seat 6 is arranged in front of the seat support 5 in the direction of travel. Moreover, the safety bar 4 is mounted on the seat support 5 in order to pivot about an axis of rotation 10 to the extent that the safety bar 4 encompasses the passenger and keeps the passenger's body securely in the seat. In order to ensure the best-possible view to the right and to the left for the passenger during the ride, the safety bar 4 has a bow shape.

In order to open and close the safety bar 4, two bar adjusting units 40 are arranged on the seat support 5, each bar adjusting unit being supported in a rotating manner on the seat support 5 by means of a cylinder bearing 43 on one side and each being coupled to the safety bar 4 by means of a deflection rocker 41 and a connecting rod 42 on the other side. Upon closing of the safety bar 4, the safety bar is pivoted into a closed position such that the passenger is always securely held on the seat 6 depending on the passenger's anatomy, i.e. body size and body shape. Accordingly, the safety bar 4 assumes a different closed position for small children than it would for heavy and/or grown people.

The bar adjusting unit 40 is preferably a hydraulic or pneumatic pressure cylinder. Alternatively, the bar adjusting unit 40 may also comprise a mechanical positioning and/or locking system.

The respective deflection rocker 41 is formed in the shape of a lever and connects the respective bar adjusting unit 40 to the connecting rod 42 and converts a feed movement of the bar adjusting unit 40 into a rotation of the deflection rocker 41 about the first axis of rotation 11. To this end, the bar adjusting unit 40 and the connecting rod 42 are articulated on the deflection rocker 41 a distance from the first axis of rotation 11, whereby the linear feed movement of the bar adjusting unit 40 or a pivot movement of the safety bar 4 is converted into a rotation of the deflection rocker 41 about the first axis of rotation 11. The resulting rotational movements upon opening of the safety bar 4 are indicated by means of arrow lines in FIG. 4. A deflection rocker 41 is fixed in position on a first axis of rotation 11, on a first end 51 and on a second end 52 respectively, by means of a shaft-hub connection.

The first axis of rotation 11 is a component of the secondary bar securing device 3 which further comprises a second axis of rotation 12, a linkage 13, an adjustment device 20, a first blocking element 21, and a second blocking element 22. The first blocking element 21 has a wedge surface aligned coaxially with respect to the first axis of rotation 11, and the second blocking element 22 has a wedge surface extending eccentrically with respect to the second axis of rotation 12.

The secondary bar securing device 3 is a secondary safety system which increases passenger safety and always blocks the safety bar 4 when the primary locking system and/or the bar adjusting unit malfunctions.

As an alternative to the exemplary embodiment shown in FIG. 1, the first axis of rotation 11 of the secondary bar securing device 3 may also be the axis of rotation 10 of the safety bar 4.

Figure 2:
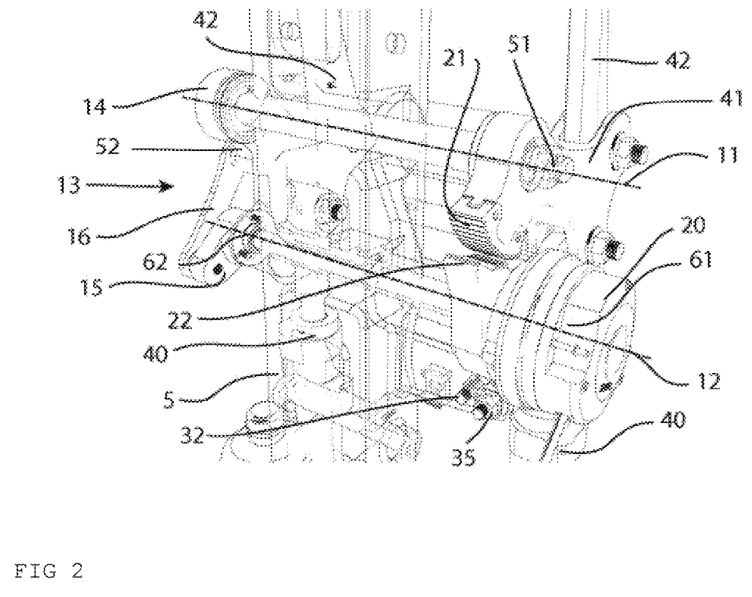
FIG. 2 an enlarged perspective view of the secondary bar securing device according to FIG. 1, consisting of a first axis of rotation with a first blocking element, which is coupled to the pivotable safety bar, and consisting of a second axis of rotation coupled to a second blocking element.
Figure 3:
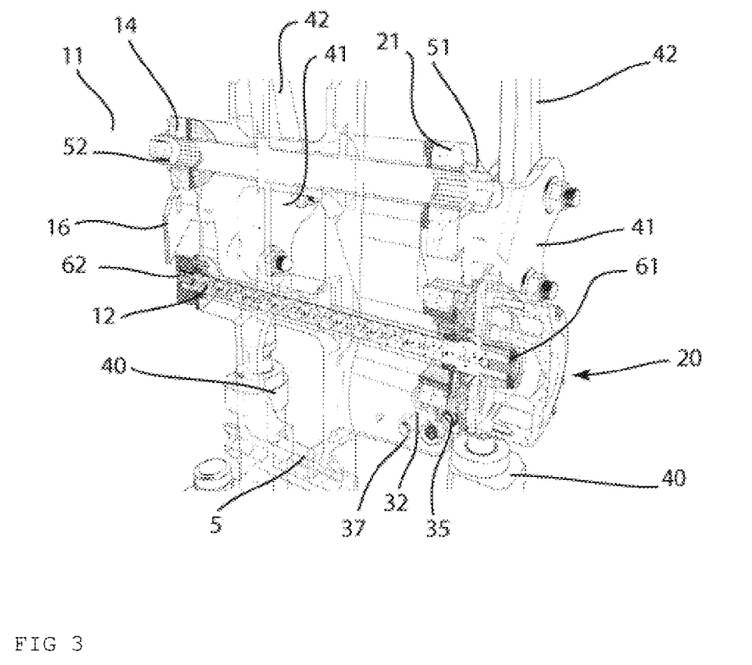
FIG. 3 a perspective and sectional view of the secondary bar securing device according to FIG. 2.

FIGS. 2 and 3 show that the first axis of rotation 11 and the second axis of rotation 12 are arranged in parallel and spaced apart so as to pivot on the seat support 5 and are connected kinematically by means of the linkage 13. The linkage 13 transfers a torque from the first axis of rotation 11 to the second axis of rotation 12 and vice versa.

The linkage 13 consists of a first lever 14, a second lever 15, and a connecting rod 16, which connects the first lever 14 and the second lever 15. The first lever 14 is arranged on the second end 52 of the first axis of rotation 11, and the second lever 15 is arranged on a second end 62 of the second axis of rotation 12. The first lever 14 and the second lever 15 in this case are arranged on the respective axis of rotation 11, 12 such that the first axis of rotation 11 and the second axis of rotation 12 are opposite. The first lever 14 and the second lever 15 are aligned approximately inverted and, together with the connecting rod 16, form a Z-shaped arrangement. As an alternative to the linkage 13, single-stage toothed gearing, for example, can be used.

The first lever 14 on the second end 52 of the first axis of rotation 11 can be finished or molded on the deflection rocker 41 attached thereto.

Furthermore, the first blocking element 21 is arranged on the first axis of rotation 11 on the first end 51, and the second blocking element 22 is arranged on a second axis of rotation 12 on a first end 61. In the exemplary embodiment shown, the first blocking element 22 is molded or finished to the deflection rocker 41, and the deflection rocker 41 is connected to the first axis of rotation 11. The first blocking element 21 and the first axis of rotation 11 rotate about the first axis of rotation 11 upon each opening and closing of the safety bar 4 with the deflection rocker 41.

The adjustment device 20 is provided on the first end 61 between the second axis of rotation 12 and the second blocking element 22, by means of said adjustment device the second blocking element 22 is coupled to or decoupled from the second axis of rotation 12, and thus the secondary bar securing device 3 can be activated or deactivated. The adjustment device 20 is an electromagnetic spring-actuated brake which, when energized, cancels a friction-type connection between the second axis of rotation 12 and the second blocking element 22 and thus interrupts the flow of force between the first blocking element 21 and the second blocking element 22.

The first blocking element 21 and the second blocking element 22 each have a toothed edge 23, 24, which are configured to engage one another with positive-locking. The toothed edge 23 of the first axis of rotation 11 is a segment of a spur gear with external toothing which is arranged on the side of the first blocking element 21, said side facing the second blocking element 22.

Figure 4:
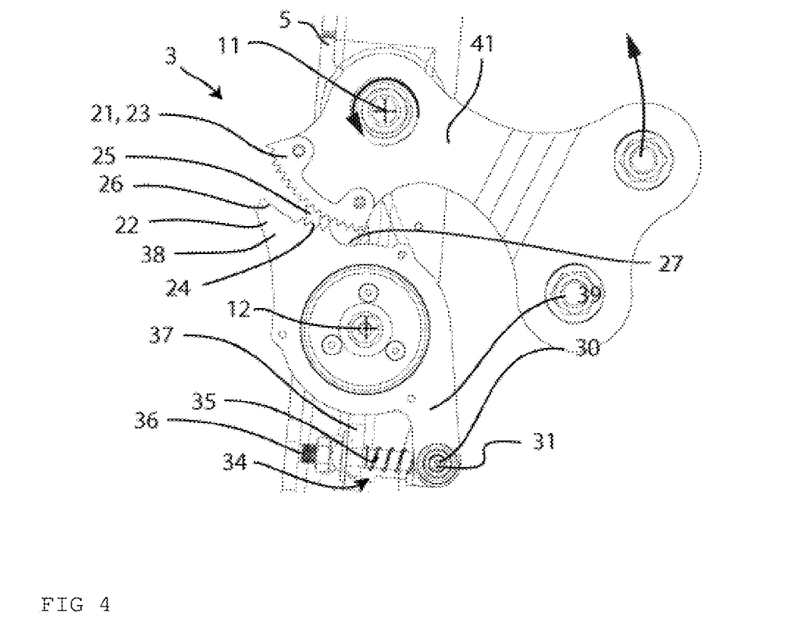
FIG. 4 a schematic side view of the secondary bar securing device according to the invention with a properly closed safety bar and/or in the starting position.
Figure 5:
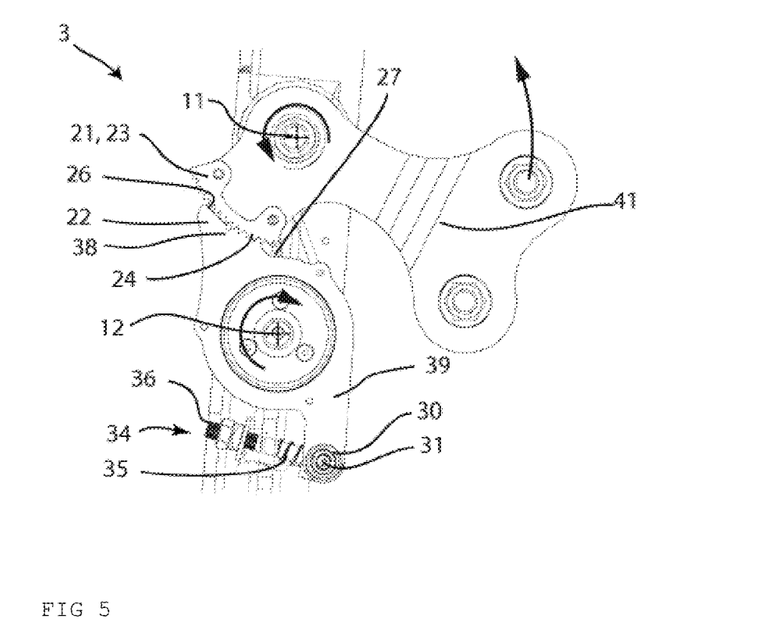
FIG. 5 a schematic side view of the secondary bar securing device according to the invention, in accordance with FIG. 4, in the blocked position of the secondary bar securing device.

In particular, FIGS. 4 and 5 show that the second blocking element 22 is formed eccentrically in sections and has a first blade 38 and a second blade 39, which project eccentrically from the second axis of rotation 12. The first blade 38 has a stop 26, the toothed edged 24, and a recess 27 on the side facing the first blocking element 21. The tooth edged 24 is arranged on the first blade 38 between the stop 26 and the recess 27, wherein the stop 26 is arranged on the first blade 38 the farthest distance away possible radially from the second axis of rotation 12. The stop 26 and the toothed edge 24 form a wedge surface aligned eccentrically with respect to the second axis of rotation 12.

The second blocking element 22 has a starting position, which is shown in FIG. 4, and a blocked position, which is shown in FIG. 5. The rotation of the second blocking element 22 into the blocked position occurs by means of a clockwise rotation, which is shown by means of an arrow line in FIG. 5.

The stop 26 and the toothed edge 24 of the first blade 38 are adapted to the shape of the first blocking element 21 such that, in the blocked position, the toothed edge 23 of the first blocking element 21 engages the toothed edge 24 of the second blocking element 22, and the stop 26 rests upon the tooth flanks of the toothed edge 23; cf. FIG. 5. The two blocking elements 21, 22 are thereby wedged together and a further rotation of the two blocking elements 21, 22 is not possible.

The starting position of the secondary bar securing device 3 and/or of the second blocking element 22 is shown in FIG. 4. In the shown starting position, the vehicle is located in the railway station and an electrical connection is established between the railway station and the vehicle, whereby the adjustment device 20 is energized and the friction-type connection between the second axis of rotation 12 and the second blocking element 22 is disconnected. The secondary bar securing device 3 is thus deactivated, and the second blocking element 22 remains in the starting position upon opening of the safety bar 4.

Furthermore, FIG. 4 shows that the first blocking element 21 and the second blocking element 22 are arranged some distance 25 apart from one another. The distance 25 between the first blocking element 21 and the second blocking element 22, together with the recess 27 in the second blocking element 22, enables free rotation of the first blocking element 21 without it being wedged together with the second blocking element 22. The safety bar 4 in the starting position can be properly opened by the bar adjusting unit 40 or manually by the passenger or operator for entry and exit.

FIGS. 4 and 5 show that a reset device 34 is provided on the second blocking element 22. The reset device 34 comprises a threaded bolt 36 and a spring 35. The threaded bolt 36 is attached rotatably to the second blade 39 of the second blocking element 22 on one side and is retained, guided in a recess, on a support 37 on the seat support 5 on the other side. The spring force of the reset device 34 is achieved by means of a compression of the spring 35 between the second blocking element 22 and the support 37, whereby it is retained in the starting position.

A double nut is screwed onto the threaded bolt 36 on the side of the support 37 facing away from the second blocking element 22. The double nut on the threaded bolt 36 forms an end stop, by means of which the gap size, the distance 25, and/or the position of the second blocking element 22 is specified in the starting position. The size of the distance 25 and/or of the gap between the first blocking element 21 and the second blocking element 22 in the starting position defines the permissible safety bar opening angle before the secondary bar securing device 3 blocks the safety bar 4. The permissible safety bar opening path is to be specified depending on the amusement ride and risk assessment.

Moreover, the reset device 34 ensures that the safety bar 4 can be closed as well during the ride and/or in the de-energized state of the vehicle. In this state, the second blocking element 22 is situated in the starting position. However, a rotation of the second axis of rotation 12 opposite the blocking element 22 is possible due to exceeding of the frictional torque of the adjustment device 20.

The spring force of the spring 35 of the reset device 34 is to be dimensioned such that the torque exerted onto the second blocking element 22 by the spring force does not exceed the frictional torque of the adjustment device 20, which is formed as a coupling.

The blocked position, which is shown in FIG. 5, can also be canceled manually in that a locking bolt 31 of an emergency manual function 30 is actuated. Upon actuation of the locking bolt 31, said bolt engages a link 32 supported on the seat support 5, whereby a rotation of the second blocking element 22 into the blocked position is prevented. This function is necessary, for example, upon an evacuation of the vehicle when there is no power available for actuating the adjustment device 20.

Before the start of the ride, the passenger sits down on the seat 6, and the safety bar 4 is closed by the bar adjusting unit 40. The closing angle of the safety bar 4 differs depending on the anatomy, i.e. the body shape and body size, of the passenger. After the release for start or when the railway station is exited, the secondary bar securing device 3 is activated. Upon the activation of the adjustment device 20, the closing angle adapted to the passenger is specified as a closed position of the safety bar 4 in that the adjustment device 20 couples the second blocking element 22, which is in the starting position, to the second shaft 12. Thus, the closed position corresponds to the closing angle of the safety bar 4, which is secured by the secondary bar securing device 3 in the event of a malfunction of the primary securing device.

During travel of the vehicle, the safety bar 4 is retained in the closing angle and/or the closed position by means of the two bar adjusting units 40. The bar adjusting units 40 thus form the primary securing device. In the event of malfunction of the bar adjusting units 40, the locking function of the safety bar 4 is disabled and the safety bar 4 exits the closed position and opens. Upon this opening movement, the pivot movement of the safety bar 4 is transferred to the deflection rocker 41 by the connecting rod 42. The first axis of rotation 11 and the second axis of rotation 12 are twisted oppositely. The blocking elements 21, 22 are subsequently relatively freely movable with respect to one another within the specified accepted distance 25.

As soon as the tooth flanks of the toothed edge 23 of the first blocking element 21 and the tooth flanks of the toothed edge 24 of the second blocking element 22 make contact, the two toothed edges 23, 24 rotate reciprocally and wedge together. The secondary bar securing device 3 and/or the second blocking element 22 is thus transitioned into the blocked position. During the blocking process, the deflection rocker 41 and/or the first blocking element 21 and the second blocking element 22 rotate from the starting position into the blocked position according to the arrow lines shown in FIG. 5.

Upon this opening movement, the pivot movement of the safety bar 4 is transferred to the deflection rocker 41 by the connecting rod 42. The first axis of rotation 11 and the second axis of rotation 12 are twisted oppositely, and the first blocking element 21 and the second blocking element 22 are transitioned into the blocked position and wedged together, as shown in FIG. 5. The wedging together of the first blocking element 21 and of the second blocking element 22 suppresses a further rotation of the deflection rocker 41, whereby the opening movement of the safety bar 4 is blocked and an opening of the safety bar 4 is no longer possible even when the adjustment device 20 is opened.

The operator thus receives the notification that the bar adjusting units 40 and/or the primary securing device has malfunctioned. The vehicle should then be disabled and repaired.

In order to open the safety bar 4 when the bar adjusting units 40 have malfunctioned, it only must be pivoted a bit in the closing direction. The secondary bar securing device 3 is thereby released and re-blocking of the safety bar 4 is prevented by means of an opening of the adjustment device 20.

As an alternative to the exemplary embodiment shown, the first axis of rotation 11 may also be the axis of rotation 10 of the safety bar 4. The axis of rotation 10 of the safety bar 4 is thus the first axis of rotation 11, on which the first blocking element 21 is arranged in a non-torsional manner.

Figure 6:
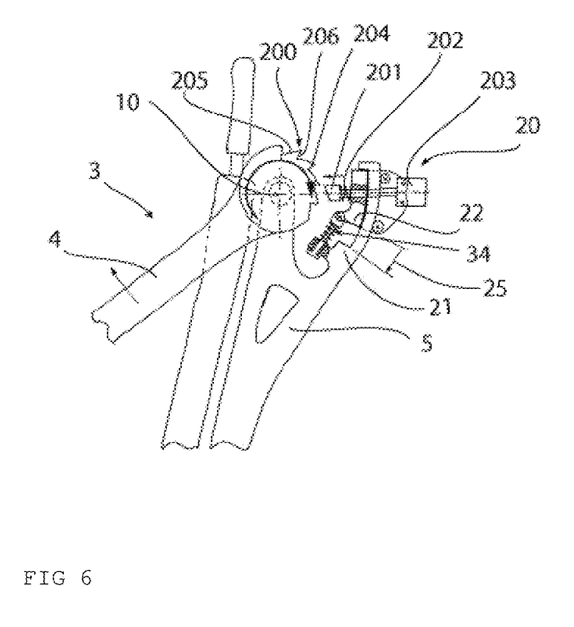
FIG. 6 a schematic view of a second exemplary embodiment of the secondary bar securing device according to the invention.

FIG. 6 shows a second exemplary embodiment according to the invent ion.

The secondary bar securing device 3 is arranged in the area of the axis of rotation 10 of the safety bar 4.

The first blocking element 21 is movably arranged on the seat support 5 by means of a carriage guide and can be coupled to the safety bar 4 by the adjustment device 20, as is explained in greater detail in the following, whereby a pivot movement of the safety bar 4 can be converted into a shifting of the blocking element 21. The blocking element 21 is retained in the starting position in a spring-loaded manner by means of the reset device 34.

The adjustment device 20 is a positive-locking connectable coupling and comprises a locking profile 200, a locking pin 201, a preloaded spring 202, and a solenoid 203.

The locking profile 200 is connected to the safety bar 4 in a non-torsional manner and has a plurality of locking noses 204, which are formed from running surfaces 205 and locking edges 206. The locking edges 206 project substantially radially from the axis of rotation 10, and the running surfaces 205 are arranged in the form of a spiral with respect to the axis of rotation 10. The shape of the locking pin 201 corresponds with the shape of at least one locking nose 204.

The adjustment device 20 is designed to be fail-safe, i.e. it is always activated in the event of a malfunction in the adjustment device 20. Consequently, the secondary bar securing device 3 is also activated.

The active connection between the locking profile 200 and the locking pin 201 is disconnected when the adjustment device 20 is energized. The locking pin 201 is removed from the locking profile 200 by the solenoid 203 with compression of the preloaded spring 202. In this state, the safety bar 4 can be pivoted freely and the secondary bar securing device 3 is deactivated.

After a passenger has entered the vehicle, the safety bar 4 is closed by the bar adjusting unit 40. After the release for start and/or when the railway station is exited, the secondary bar securing device 3 is de-energized due to disconnection of the power supply to the adjustment device 20, and thus the secondary bar securing device 3 is activated. Due to the pretension force of the pre-loaded spring 202, the locking pin 201 engages the locking profile 200, whereby the closed position of the safety bar 4, which is based on the passenger's anatomy, is specified.

During travel of the vehicle, the safety bar 4 is retained in the closed position by means of the two bar adjusting units 40. In the event of a malfunction of the bar adjusting units 40, which are simultaneously the primary securing device, the safety bar 4 exits the closed position and opens. Upon this opening movement from the closed position, the pivot movement of the safety bar 4 is transferred to the first blocking element 21 by means of the adjustment device 20, whereby said blocking element moves along the accepted path, which corresponds to the distance 25, in the direction of the second blocking element 22. Once the accepted adjustment path is exceeded, a further rotation is prevented by the blocking contact between the first blocking element 21 and the second blocking element 22, whereby the safety bar 4 is placed in a fixed position.

The permissible tolerance opening angle of the safety bar 4 can be compensated for in a spring-loaded manner by a corresponding dimensioning of the distance 25 without the secondary bar securing device 3 and/or the second blocking element 22 experiencing a load. The secondary bar securing device 3 takes over the load of the primary system, of the bar adjusting unit 40, only when the intended tolerance range is exited. The secondary bar securing device 3 is thus free of load and thus free of wear with the proper function of the bar adjusting units 40.

Thus, according to the invention, a secondary bar securing device 3, a seat assembly 2 with a secondary bar securing device 3 according to the invention, as well as an amusement ride 1 can be provided, which provide reliable securing of a safety bar 4, which only block the safety bar 4 when the primary locking system and/or the bar adjusting units 40 malfunction. The components of the secondary bar securing device 3 according to the invention have a streamlined, lightweight shape and block the safety bar 4 with very little force required upon a malfunction of the primary locking system and/or of the bar adjusting unit 40.

LIST OF REFERENCE NUMERALS

1 Amusement park
2 Seat assembly
3 Secondary bar securing device
4 Safety bar
5 Seat support
6 Seat
10 Axis of rotation
11 First axis of rotation
12 Second axis of rotation
13 Linkage
14 First lever
15 Second lever
16 Connecting rod
20 Adjustment device
21 First blocking element
22 Second blocking element
23 Toothed edge of 21
24 Toothed edge of 22
25 Distance
26 Stop
27 Recess
30 Emergency manual function
31 Bolt
32 Link
34 Reset device
35 Spring
36 Threaded bolt
37 Support
38 First blade of 22
39 Second blade of 22
40 Bar adjusting unit
41 Deflection rocker
42 Connecting rod
43 Cylinder bearing
51 First end of 11
52 Second end of 11
61 First end of 12
62 Second end of 12
200 Locking profile
201 Locking pin
202 Preloaded spring
203 Solenoid
204 Locking nose
205 Running surface
206 Locking edges

The invention claimed is:

1. A secondary bar securing device (3) of a safety bar (4) of an amusement ride, comprising:
a primary securing device which keeps the safety bar (4) in an angular position that is adapted to the anatomy of the passenger during travel of the amusement ride,
at least one first blocking element (21) and at least one second blocking element (22),
wherein the at least one first blocking element (21) and the at least one second blocking element (22) are arranged at a distance (25) from each other,
wherein, in the event of a malfunction of the primary securing device, the safety bar (4) can be moved in a tolerance opening angle,
wherein the tolerance opening angle correlates to the distance (25) between the at least one first and the at least one second blocking element (21, 22),
and, wherein, if the tolerance opening angle is exceeded, the at least one first blocking element (21) and the at least one second blocking element (22) block the safety bar (4).

2. The secondary bar securing device (3) according to claim 1, comprising:
at least one first axis of rotation (10, 11), which is coupled to a pivot movement of the safety bar (4),
at least one second axis of rotation (12), which is coupled in a rotational manner to the at least one first axis of rotation (11),
wherein the at least one first blocking element (21) is provided on the at least one first axis of rotation (10, 11),
wherein the at least one second blocking element (22) is provided on the at least one second axis of rotation (12),
wherein, in the flow of force between the at least one first blocking element (21) and the at least one second blocking element (22), at least one positioning element (20) is provided, and
wherein, in the activated state of the at least one positioning element (20), the at least one first blocking element (21) and the at least one second blocking element (22) wedge together upon a rotation of the axes of rotation (10, 11, 12).

3. The secondary bar securing device (3) according to claim 2, characterized in that the at least one positioning element (20) is arranged between one of the axes of rotation (10, 11, 12) and one of the blocking elements (21, 22).

4. The secondary bar securing device (3) according to claim 2, characterized in that the at least one positioning element (20) of a coupling is an electromagnetic spring-actuated brake, an electromagnetic actuator, a permanent magnet brake, or the like.

5. The secondary bar securing device (3) according to claim 2, characterized in that the at least one first axis of rotation (10, 11) is coupled to the at least one second axis of rotation (12) by means of at least one linkage (13).

6. The secondary bar securing device (3) according to claim 2, characterized in that the at least one first axis of rotation (10, 11) is coupled to the at least one second axis of rotation (12) by means of at least one toothed gear.

7. The secondary bar securing device (3) according to claim 2, characterized in that at least one of the blocking elements (21, 22) is formed eccentrically, in areas, with respect to the respective axis of rotation (10, 11, 12).

8. The secondary bar securing device (3) according to claim 2, characterized in that the at least one first axis of rotation (10, 11) is arranged parallel to and spaced apart from the at least one second axis of rotation (12).

9. The secondary bar securing device (3) according to claim 2, characterized in that the at least one first axis of rotation (10, 11) and the at least one second axis of rotation (12) are coupled oppositely.

10. The secondary bar securing device (3) according to claim 2, characterized in that at least one of the blocking elements (21, 22) has at least one eccentric stop (26).

11. The secondary bar securing device (3) according to claim 2, characterized in that the blocking elements (21, 22) have at least one toothed edge (23, 24) corresponding to one another.

12. The secondary bar securing device (3) according to claim 1, characterized in that at least one reset device (34) is provided, by means of which at least one of the blocking elements (21, 22) is retained in a starting position by means of a spring force.

13. The secondary bar securing device (3) according to claim 12, characterized in that, in the starting position of the blocking elements (21, 22), a distance (25) is provided between the blocking elements (21, 22).

14. The secondary bar securing device (3) according to claim 1, characterized in that an emergency manual function (30) is provided, by means of which a wedging together of the blocking elements (21, 22) is prevented when the positioning element (20) is activated.

15. A seat assembly (2) of an amusement ride (1), comprising:
at least one seat (6) for at least one passenger;
at least one safety bar (4) pivotable about an axis of rotation (10) for the at least one passenger;
at least one secondary bar securing device (3) for the at least one safety bar (4) according to claim 1; and
at least one adjusting unit (40);
wherein the at least one adjusting unit (40) pivots the at least one safety bar (4).

16. The seat assembly (2) according to claim 15, characterized in that the at least one bar adjusting unit (40) is a pressure cylinder or a mechanical locking cylinder.

17. The seat assembly (2) according to claim 15, characterized in that a deflection rocker (41) is provided for transferring the feed movement between the at least one bar adjusting unit (40) and the at least one safety bar (4), said deflection rocker being coupled to the at least one first axis of rotation (11) and with a rotational movement being transferred to the at least one first axis of rotation (11) upon actuation of the at least one bar adjusting unit (40).

18. The seat assembly (2) according to claim 15, characterized in that the axis of rotation (10) is the first axis of rotation (11) of the secondary bar securing device (3).

19. An amusement ride (1) with a rail and at least one vehicle moveable on the rail having at least one seat assembly (2) according to claim 15.

20. The amusement ride (1) according to claim 19, characterized in that a railway station is provided, in which an electrical connection is established between the railway station and the vehicle, by means of said electrical connection the adjustment device (20) of the seat assembly (2) is energized for actuation.

* * * * *